US009357164B2

(12) United States Patent
Kalipatnapu et al.

(10) Patent No.: US 9,357,164 B2
(45) Date of Patent: May 31, 2016

(54) ESTABLISHING A REMOTELY HOSTED CONFERENCE INITIATED WITH ONE BUTTON PUSH

(75) Inventors: Rajah K. V. R. Kalipatnapu, San Jose, CA (US); Yu Guo, San Jose, CA (US); Krutarth M. Shah, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1451 days.

(21) Appl. No.: 12/050,581

(22) Filed: Mar. 18, 2008

(65) Prior Publication Data

US 2009/0240770 A1  Sep. 24, 2009

(51) Int. Cl.
| | |
|---|---|
| G06F 15/16 | (2006.01) |
| H04N 7/15 | (2006.01) |
| H04L 12/18 | (2006.01) |
| H04M 3/56 | (2006.01) |

(52) U.S. Cl.
CPC .............. *H04N 7/15* (2013.01); *H04L 12/1818* (2013.01); *H04M 3/567* (2013.01)

(58) Field of Classification Search
CPC .............................. H04L 12/8181; H04N 7/15
USPC .................................................. 709/204–207
See application file for complete search history.

(56) References Cited

U.S. PATENT DOCUMENTS

| | | | | |
|---|---|---|---|---|
| 5,408,526 A | | 4/1995 | McFarland et al. ............ 379/202 |
| 5,544,237 A | | 8/1996 | Bales et al. ................... 379/205 |
| 5,781,731 A | * | 7/1998 | Koreeda et al. ............... 709/204 |
| 5,802,058 A | * | 9/1998 | Harris et al. .................. 370/410 |
| 5,812,652 A | * | 9/1998 | Jodoin et al. ............. 379/205.01 |
| 5,835,718 A | | 11/1998 | Blewett |
| 5,884,039 A | | 3/1999 | Ludwig et al. ................ 395/200 |
| 5,913,062 A | * | 6/1999 | Vrvilo et al. .................. 719/321 |
| 5,999,525 A | * | 12/1999 | Krishnaswamy et al. .... 370/352 |
| 6,035,036 A | | 3/2000 | Eisenbraun et al. .......... 379/446 |
| 6,363,352 B1 | * | 3/2002 | Dailey et al. ................. 705/7.19 |
| 6,374,102 B1 | | 4/2002 | Brachman et al. ............ 455/422 |
| 6,487,585 B1 | * | 11/2002 | Yurkovic ....................... 709/206 |
| 6,731,732 B2 | | 5/2004 | Creamer et al. ......... 379/201.03 |
| 6,760,423 B1 | | 7/2004 | Todd ........................ 379/202.01 |

(Continued)

OTHER PUBLICATIONS

The First Office Action from State Intellectual Property Office of the People's Republic of China dated Jan. 19, 2011, in regard to Application No. 200780013980.7.

(Continued)

*Primary Examiner* — Hua Fan
(74) *Attorney, Agent, or Firm* — Baker Botts L.L.P.

(57) ABSTRACT

A method includes registering with a first remote conference manager operated by a first entity and a request to enable conferencing with a second entity. The method also includes querying the first remote conference manager for at least one conference room hosted by the second entity and updating a directory of conference rooms comprising at least one local conference room to further comprise the at least one remote conference room. The method further includes receiving a request to schedule a conference. Upon determining at least one remote conference room is to be used for the scheduled conference, the method also includes transmitting the request to the first remote conference manager. Upon the second remote conference manager transmitting an acceptance of the conference, the method also includes receiving details from the first remote conference manager for establishing a connection for use with the conference and transmitting the details to the at least one local conference room.

22 Claims, 5 Drawing Sheets

(56) References Cited

U.S. PATENT DOCUMENTS

| | | | |
|---|---|---|---|
| 6,771,766 B1* | 8/2004 | Shafiee et al. | 379/265.09 |
| 6,801,604 B2* | 10/2004 | Maes et al. | 379/88.17 |
| 6,870,916 B2 | 3/2005 | Henrikson et al. | 379/202.01 |
| 6,876,734 B1* | 4/2005 | Summers et al. | 379/202.01 |
| 6,941,349 B2 | 9/2005 | Godfrey et al. | 709/207 |
| 6,989,856 B2* | 1/2006 | Firestone et al. | 348/14.09 |
| 7,046,779 B2* | 5/2006 | Hesse | 379/202.01 |
| 7,051,049 B2 | 5/2006 | Samn | |
| 7,054,918 B2 | 5/2006 | Polcyn | 709/217 |
| 7,152,093 B2 | 12/2006 | Ludwig et al. | 709/204 |
| 7,206,809 B2 | 4/2007 | Ludwig et al. | 709/204 |
| 7,233,589 B2* | 6/2007 | Tanigawa et al. | 370/352 |
| 7,436,428 B2* | 10/2008 | Schrader et al. | 348/14.08 |
| 7,477,282 B2* | 1/2009 | Firestone et al. | 348/14.09 |
| 7,593,354 B2* | 9/2009 | Surin et al. | 370/260 |
| 7,593,520 B1* | 9/2009 | Croak et al. | 379/202.01 |
| 7,773,581 B2* | 8/2010 | Punj et al. | 370/352 |
| 8,614,732 B2* | 12/2013 | Baird et al. | 348/14.08 |
| 8,659,636 B2* | 2/2014 | Firestone et al. | 348/14.08 |
| 8,881,029 B2* | 11/2014 | Thapa | 715/756 |
| 2001/0014866 A1 | 8/2001 | Commy | 705/9 |
| 2002/0123895 A1* | 9/2002 | Potekhin et al. | 704/275 |
| 2002/0184373 A1* | 12/2002 | Maes | 709/228 |
| 2003/0058806 A1 | 3/2003 | Meyerson et al. | 370/260 |
| 2003/0088421 A1* | 5/2003 | Maes et al. | 704/270.1 |
| 2003/0174826 A1* | 9/2003 | Hesse | 379/210.01 |
| 2004/0001446 A1 | 1/2004 | Bhatia et al. | 370/261 |
| 2004/0064355 A1 | 4/2004 | Dorenbosch et al. | 705/9 |
| 2004/0107255 A1 | 6/2004 | Ludwig et al. | 709/204 |
| 2004/0125933 A1 | 7/2004 | Jun et al. | |
| 2004/0223464 A1* | 11/2004 | Dye et al. | 370/260 |
| 2004/0240650 A1 | 12/2004 | Bear et al. | 379/142 |
| 2005/0002514 A1* | 1/2005 | Shafiee et al. | 379/265.09 |
| 2005/0008024 A1* | 1/2005 | Newpol et al. | 370/401 |
| 2005/0041646 A1* | 2/2005 | Punj et al. | 370/352 |
| 2005/0078170 A1* | 4/2005 | Firestone et al. | 348/14.08 |
| 2005/0078171 A1* | 4/2005 | Firestone et al. | 348/14.08 |
| 2005/0084086 A1* | 4/2005 | Hesse | 379/202.01 |
| 2005/0094621 A1* | 5/2005 | Acharya et al. | 370/352 |
| 2005/0181872 A1* | 8/2005 | Acharya et al. | 463/35 |
| 2005/0237931 A1* | 10/2005 | Punj et al. | 370/229 |
| 2005/0237952 A1* | 10/2005 | Punj et al. | 370/260 |
| 2005/0248652 A1* | 11/2005 | Firestone et al. | 348/14.09 |
| 2005/0267975 A1 | 12/2005 | Qureshi et al. | |
| 2006/0015376 A1 | 1/2006 | Sattler et al. | 705/5 |
| 2006/0023062 A1* | 2/2006 | Elbaze et al. | 348/14.09 |
| 2006/0026002 A1* | 2/2006 | Potekhin et al. | 704/275 |
| 2006/0045030 A1 | 3/2006 | Bieselin | |
| 2006/0045253 A1 | 3/2006 | Bieselin et al. | |
| 2006/0062367 A1 | 3/2006 | Christenson | 379/202.01 |
| 2006/0088152 A1 | 4/2006 | Green et al. | 379/202 |
| 2006/0171337 A1* | 8/2006 | Shaffer et al. | 370/261 |
| 2006/0187859 A1* | 8/2006 | Shaffer et al. | 370/260 |
| 2007/0064901 A1* | 3/2007 | Baird et al. | 379/202.01 |
| 2007/0111743 A1* | 5/2007 | Leigh et al. | 455/518 |
| 2007/0124377 A1* | 5/2007 | Schmidt et al. | 709/204 |
| 2007/0171898 A1* | 7/2007 | Salva | 370/356 |
| 2007/0180029 A1* | 8/2007 | Croak et al. | 709/204 |
| 2007/0223675 A1* | 9/2007 | Surin et al. | 379/202.01 |
| 2007/0263825 A1* | 11/2007 | Shah et al. | 379/202.01 |
| 2007/0285503 A1* | 12/2007 | Asthana et al. | 348/14.08 |
| 2007/0285504 A1* | 12/2007 | Hesse | 348/14.08 |
| 2007/0291108 A1* | 12/2007 | Huber et al. | 348/14.02 |
| 2007/0291667 A1* | 12/2007 | Huber et al. | 370/260 |
| 2008/0046514 A1 | 2/2008 | Daughtry et al. | |
| 2008/0063173 A1* | 3/2008 | Sarkar et al. | 379/202.01 |
| 2008/0120381 A1* | 5/2008 | Awan et al. | 709/206 |
| 2008/0165944 A1 | 7/2008 | Rosenthal et al. | |
| 2009/0043627 A1 | 2/2009 | Vaidya et al. | 705/8 |
| 2009/0044132 A1* | 2/2009 | Combel et al. | 715/753 |
| 2009/0240770 A1* | 9/2009 | Kalipatnapu et al. | 709/204 |
| 2009/0298587 A1* | 12/2009 | Acharya et al. | 463/35 |
| 2009/0323561 A1* | 12/2009 | Croak et al. | 370/261 |

OTHER PUBLICATIONS

Prabhune, et al., *One Button Conference Initiation*, U.S. Appl. No. 12/048,724, filed Mar. 14, 2008.

Shah et al., U.S. Appl. No. 11/483,815, filed Jul. 10, 2006, *Accessing a Calendar Server to Facilitate Initiation of a Scheduled Call*, Communication from the United States Patent and Trademark Office dated Sep. 8, 2009.

Prabhune et al., U.S. Appl. No. 12/048,724 patent application filed Mar. 14, 2008 entitled *One Button Conference Initiation*.

PCT Notification of Transmittal of the International Search Report and the Written Opinion of the ISA, or the Declaration for PCT/US 2007/09507; ISA/US; mailed Aug. 21, 2008.

Shah et al., U.S. Appl. No. 11,483,815, filed Jul. 10, 2006 Communication from the United States Patent and Trademark Office dated Aug. 12, 2008.

Shah et al., U.S. Appl. No. 11,483,815, filed Jul. 10, 2006 Communication from the United States Patent and Trademark Office dated Feb. 26, 2009.

Prabhune et al., U.S. Appl. No. 12/048,724, Office Action from the U.S. Patent and Trademark Office dated Jun. 24, 2011.

Prabhune et al., U.S. Appl. No. 12/048,724, Response to Jun. 24, 2011 Office Action from the U.S. Patent and Trademark Office mailed Sep. 26, 2011.

USPTO Non-final Office Action dated Dec. 6, 2013; U.S. Appl. No. 12/048,724, filed Mar. 14, 2008, inventor Prabhune et al.

* cited by examiner

ESTABLISHING A REMOTELY HOSTED CONFERENCE INITIATED WITH ONE BUTTON PUSH

TECHNICAL FIELD

This invention relates generally to the field of telecommunications and more specifically to establishing a remotely hosted conference initiated with one button push.

BACKGROUND

As technology evolves and develops, users are presented with an ever increasing selection of options and features. Unfortunately, this increase in selection and features is often accompanied by an increase in complexity. This complexity increase is not limited to the "behind the scenes" complexity involved in making the features or options work, but is often present in the user interface. In order to take advantage of the new features and options the user may have to make several decisions about what features they want and how they want them to be implemented.

One area in which this is particularly prevalent is in various types of conferencing solutions. Not only does the user need to know the phone number of the other party, or the "call-in" number for the conference, but they may also have to know a conference ID number, a log-in ID and one or more passwords. In addition, just because their device supports a particular feature does not mean that the other party's device is able to support that feature or that the feature will be automatically enabled upon the start of the conference. The complexity of conferencing systems, especially video conferencing systems, can be seen by the need for information technology (IT) personnel to setup the various components needed for each video conference.

BRIEF DESCRIPTION OF THE DRAWINGS

For a more complete understanding of particular embodiments and their features and advantages, reference is now made to the following description, taken in conjunction with the accompanying drawings, in which.

DESCRIPTION

Overview:

In accordance with particular embodiments, a method includes registering with a first remote conference manager operated by a first entity. The method also includes transmitting to the first remote conference manager a request to enable conferencing with a second entity. The second entity operates a second remote conference manager registered with the first remote conference manager. The method also includes querying the first remote conference manager for at least one conference room hosted by the second entity. The method additionally includes updating a directory of conference rooms comprising at least one local conference room to further comprise the at least one remote conference room. The method further includes receiving a request to schedule a conference. Upon determining at least one remote conference room is to be used for the scheduled conference, the method also includes transmitting the request to the first remote conference manager. Upon the second remote conference manager transmitting an acceptance of the conference, the method also includes receiving details from the first remote conference manager for establishing a connection for use with the conference and transmitting the details for establishing the connection for use with the conference to the at least one local conference room.

Description of Example Embodiments

Figure 1:
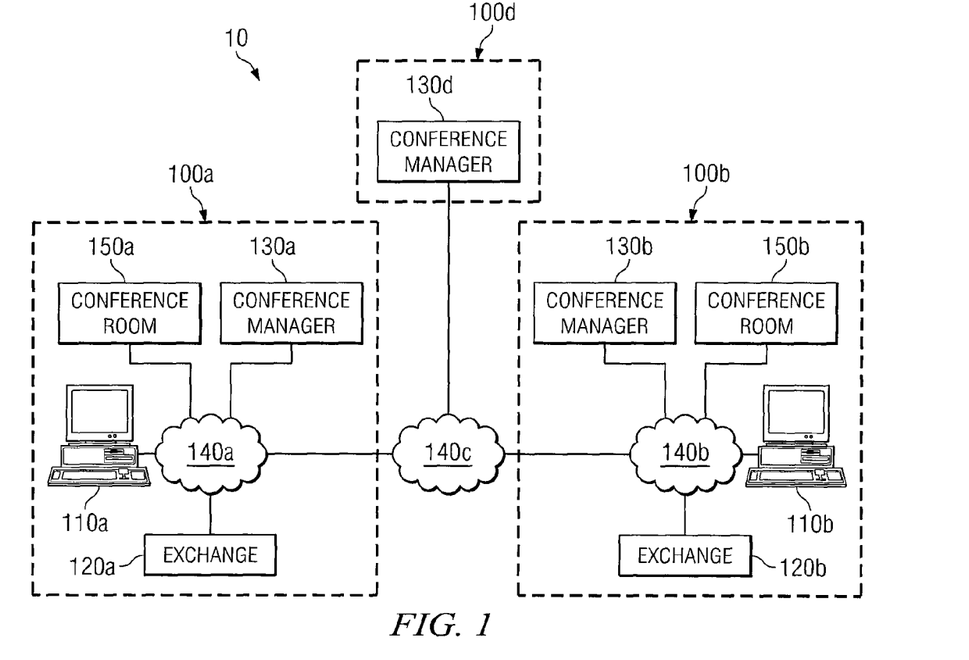
FIG. 1 is a block diagram illustrating a system for videoconferencing between sites using a remote host, in accordance with particular embodiments.

FIG. 1 is a block diagram illustrating a system 10 for videoconferencing between sites 100a and 100b. The illustrated embodiment includes computers 110, exchanges 120, conference managers 130, networks 140, and conference rooms 150. More specifically, computer 110a, exchange 120a, conference manager 130a, and conference room 150a of site 100a are coupled together by network 140a and computer 110b, exchange 120b, conference manager 130b, and conference room 150b of site 100b are coupled together by network 140b. Additionally, network 140c couples sites 100a, 100b and 100d to facilitate in preparing, initiating, and conducting a conference hosted by site 100d. These components may allow a user to schedule a conference by simply using computer 110a to identify such information as the desired attendees, time of the conference and/or the conference rooms to be used. This information, or some manipulation thereof, may be exchanged with conference manager 130d to facilitate in having site 100d host a conference between site 100a and site 100b. The conference may include any combination of audio, video, or data elements.

Examining these components in detail, sites 100 may represent different companies, enterprise networks, office sites, or any other type of location or topology that may separate networks 140. For example, site 100a may be a first company's office, site 100b may be a second company's office, and site 100d may be a conferencing service provider. Just as the physical location of sites 100 may vary, so may the various components within sites 100. Both the first company and the second company may be clients of, or have a business relationship with, the conferencing service provider. For example, they may have both entered into agreements with the conferencing service provider to act as a host for remotely hosted conferences.

Computers 110 may include any combination of hardware, software, and/or encoded logic operable to provide a user with an interface through which he may schedule a conference with other users. For example, computer 110a may be a PC with a calendaring program installed thereon. The user may use the calendaring program to schedule a conference with other users. The other users may be selected from a contact list, entered manually, or otherwise inputted or loaded into a calendar event created for the conference being scheduled. The other users, or participants, may be local to (e.g., part of the same organization, within the same building, etc.), or remote from (e.g., different enterprise networks, separate sites, etc.), the user scheduling the conference.

Exchanges 120 may be any type of business message platform operable to maintain and/or organize email, files, task lists, and/or calendar and contact information (collectively, "messaging data"). Thus, exchanges 120 may allow email, files and other data to be accessed at any time from a single device. For example, if site 100a is a business and exchange 120a is used to store the company's messaging data, then a first employee of the company may be able to see the availability of another employee. In particular embodiments, exchanges 120 may comprise Microsoft Exchange Servers, Lotus Notes, or any other client-server collaboration application. Exchanges 120 may be able to communicate with one another and/or with any components within their respective site. For example, exchange 120b may be able to communicate with exchange 120a and/or any of the components within site 100b. The information stored within exchanges 120 and its ability to communicate with other components may be used to help facilitate scheduling a conference.

Conference managers 130 may be any combination of hardware, software, and/or encoded logic operable to provide, either alone or in combination with other components of sites 100, one touch conference initiation. In particular embodiments, for a conference involving conference managers 130a and 130b conference manager 130a may coordinate the conference details with conference manager 130d, while conference manager 130d coordinates the conference details with conference manager 130b. Thus, conference manager 130d may act as a proxy for conference managers 130a and 130b. Once the details have been coordinated, conference manager 130a may then push or publish any information regarding the conference to any of the components of site 100a that may need the information. For example, conference manager 130a may provide a phone within conference room 150a with the phone numbers that may be needed for the conference (e.g., a fully qualified number for the conference or the phone number of the phone in conference room 150b). The phone may then become a conference initiator because with the push of a single button the user may be able to initiate the conference. Conference manager 130a may also send information to other conference room components (e.g., a display device, a video camera, etc.) or provide additional information to the IP phone for the IP phone to transmit to the other components within the conference room. Thus, once the user enters the conference room she may simply press a single button on the conference initiator and all the equipment needed for the conference may be activated and become ready for use. For example, upon pressing the single button, the monitors may turn on and become ready to receive a video signal from the remote participants. Conference manager 130a may also generate or publish information for presentation to the participants if, for example, there has been a change to the conference (e.g., the attendees from site 100b can not participate at the requested time). In some embodiments, once the user initiates the conference from the conference initiator within conference room 150a, conference manager 130a may perform any switching, routing and/or synchronizing of audio, video and/or data that may be needed to ensure that the audio, video and data for the conference is sent to and received from conference manager 130d in a coherent, synchronized manner.

In particular embodiments, conference manager 130d may act as a host while conference managers 130a and 130b act as clients. In such an arrangement, conference managers 130a and 130b may communicate with each other indirectly through conference manager 130d. This may allow sites 100a and 100b to provide each other with information regarding their conferencing capabilities and features without allowing each other direct access. This may be desirable where, for example, site 100a conducts conferences with several other sites. More specifically, rather than allowing each of the other remote sites access to, for example, the availability of its conference rooms, site 100a may simply provide conference manager 130d with access to the availability of its conference rooms and allow conference manager 130d to selectively convey this information to other sites. This may further be facilitated through the use of aliases. For example, site 100b may provide conference manager 130d with an alias representing a subset of its available conference rooms or fictional conference rooms representing all or some of the features available in actual conference rooms. Using conference manager 130d to host conferences may also be desirable for establishing conferences with sites for the first time. For example, if sites 100a and 100b both have business relationships with site 100d, then it may be relatively straight forward for sites 100a and 100b to have a conference between each other through site 100d. In other words, because they may both trust site 100d they may not have to determine if they trust one another. In some embodiments, from the perspective of site 100a, even though site 100b may be hosting the conference room conference manager 130a may communicate with conference manager 130d as though site 100d was hosting the conference room.

Networks 140 may comprise any desired communication equipment, including hardware, software and/or any appropriate controlling logic, for interconnecting sites 100 and any appropriate components of sites 100. Thus, networks 140 may facilitate communication between and within sites 100. Networks 140 may include local area networks (LANs), metropolitan area networks (MANs), wide area networks (WANs), any other public or private networks, local, regional, or global communication networks, enterprise intranets, other suitable wireline or wireless communication links, or any combination of the preceding. Networks 140 may include any combination of gateways, routers, hubs, switches, access points, base stations, and any other hardware, software, or a combination of the preceding that may implement any suitable protocol or communication.

Conference rooms 150 may include any room containing equipment that may be used in conducting or participating in a conference. The conference may include audio, video and/or other multimedia content or data. For example, conference room 150b may include speakers, microphones, speakerphones, cameras, video displays, and/or computers. Conference rooms 150 may also include conference initiators which may allow a user to initiate a conference with the other participants by simply pressing a button. The button may be a dedicated button designed solely to initiate scheduled conferences, a soft-button appearing only when a conference is available, or any other suitable control for receiving user input. Depending on the embodiment the conference initiator may be a dedicated device used solely for initiating conferences or it may be a multi-functional device where initiating a scheduled conference is just one of the features of the device. For example, in some embodiments, the conference initiator may be an IP phone which may provide any of the functionality commonly provided by phones (e.g., placing and/or receiving calls) in addition to allowing one-button conference initiation. When a conference is to take place in the conference room containing the IP phone, conference manager 130 may push certain details regarding the conference to the IP phone. Using these details the IP phone may present a soft-button for the user to use to initiate the conference. In particular embodiments, the details may be pushed to a computer from which the user may initiate the conference.

Using this process, separately managed networks, such as separate enterprise networks, may exchange information through a remote third party host or proxy regarding scheduling of conferences to support functions such as one-button-to-push conference launch.

Modifications, additions, or omissions may be made to system 10. For example, system 10 may include any suitable number of sites 100 and may facilitate conferences in any number of conference rooms 150. As yet another example, the visual conference between sites 100 may be point-to-point conferences or multipoint conferences. Moreover, the operations of system 10 may be performed by more, fewer, or other components. Additionally, operations of system 10 may be performed using any suitable logic.

Figure 2:
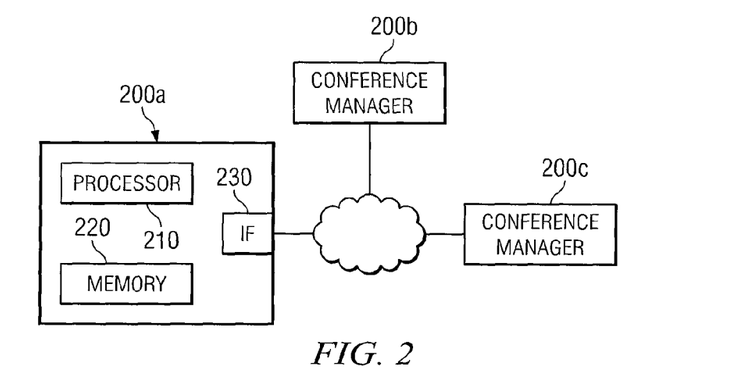
FIG. 2 is a detailed block diagram of a conference manager configured to participate in a hosted conference, in accordance with particular embodiments.

FIG. 2 is a detailed block diagram of a conference manager configured to participate in a hosted conference, in accordance with particular embodiments. Conference manager 200a comprises processor 210, memory 220, and interface 230. These components may work together to allow conference manager 200 to coordinate conference details with remote conference managers 200b and 200c and to push/publish any necessary details to the proper component(s) (e.g., a conference initiator such as an IP phone) within the appropriate conference room. While conference manager 200 is depicted as a single stand alone device, in particular embodiments it may be incorporated into other devices and/or its components may be spread out through a network or site, such as network 140a or site 100a. Conference managers 200b and 200c may have similar components and provide similar functionality as conference manager 200a. Conference managers 200 are coupled to one another by network 240, which may be similar to, and provide similar functionality as, network 140c.

Processor 210 may be a microprocessor, controller, or any other suitable computing device, resource, or combination of hardware, software and/or encoded logic operable to provide, either alone or in conjunction with other conference manager 200 components (e.g., memory 220) conference manager functionality. Such functionality may include providing various features discussed herein to a user. One feature that certain embodiments may provide may include determining the details of a particular conference and transmitting enough of the details to an appropriate device or devices (e.g., a device, such as an IP phone that is operable to initiate the conference) within the scheduled conference room to allow the conference to be initiated by a single button push. In determining the details of a particular conference, processor 210 may need to take into account information such as the number of participants of the conference, the general location of the participants, the technology needed for the conference (e.g., video, voice, data, slideshow, etc.), the capabilities of any remote participants, and any other factors or information that may be desirable.

Memory 220 may be any form of volatile or non-volatile memory including, without limitation, magnetic media, optical media, random access memory (RAM), read-only memory (ROM), removable media, or any other suitable local or remote memory component. Memory 220 may store any suitable data or information, including software and encoded logic, utilized by conference manager 200. For example, memory 220 may store one or more different credentials. More specifically, in some embodiments in which conference manager 200 operates as a client, memory 220 may store a credential associated with the entity operating conference manager 200. In some embodiments in which conference manager 200 operates as a host for other conference managers, memory 200 may maintain a listing, table, or other organization of information associating different entities (e.g., users, companies, etc.) with their respective credentials. In either scenario, the credentials may be provided by the entity providing a conferencing service (e.g., site 100d). The credentials may be used as a way to identify an entity as one which has a business relationship, or is a client of, the entity providing the conferencing service.

In particular embodiments, memory 220 may also maintain a listing, table, or other organization of information about various conference rooms that include the equipment, technology and/or features supported by each conference room. The various conference rooms may include both conference rooms that are local to conference manager 200 and those that are remote from conference manager 200. This information may be used by processor 210 in determining which conference room to use for a particular conference and whether or not to involve a remote host conference manager. For example, memory 220 may store the seating capacity of all the conference rooms at a particular site. Upon receiving a request for a conference with ten participants, processor 210 may compare the room capacities stored in memory 220 to locate a conference room able to accommodate ten participants. As another example, memory 220 may store a chart of any upcoming conferences, including which room is to be used for each conference, what time the conference is to start, how long the conference is expected to last, and what resources may be needed for the conference.

In particular embodiments, memory 220 may store a tCard for each scheduled conference, remote entity, or conference manager. The tCard may be similar to a vCard; it may store all, or some portion of, the information regarding the conference (e.g., the phone numbers to be used, the network segments to be used, the latency, the time zones of the participants, an optimal call route, the types, characteristics, and features of the endpoints involved, the features of the conference rooms and/or the type of equipment available). The information contained within the tCard may be built up by the respective conference managers as they synchronize the details for the conference. In particular embodiments the tCard may be encrypted.

Interface 230 may comprise any hardware, software, or encoded logic needed to be able to send and receive information with other components, such as an exchange server or other conference managers. For example, interface 230 may receive an email from an exchange server containing information regarding an upcoming conference. As another example, interface 230 may transmit a tCard to a remote conference manager to begin the synchronization of the conference details.

The following example may help illustrate how the components of conference managers 200 may interact to provide some of the features and benefits of particular embodiments. In this example assume that a first user who works for First Company and a second user who works for Second Company have both independently contacted Host Company, a company that hosts conferences, about establishing a business relationship (e.g., they have signed up with Host Company to provide them with remote conference hosting services). It may also be assumed that First Company is operating conference manager 200a, Second Company is operating conference manager 200b, Host Company is operating conference manager 200c, and all three companies are operating their own enterprise networks. For purposes of this example assume that the first user is using a calendaring program that interacts with a local exchange server.

Upon First Company and Second Company establishing a business relationship with Host Company, Host Company may provide the first user of First Company and the second user of Second Company with their respective credentials. Depending on the embodiment the credentials may include a passkey, password, login-ID, username, any other device or technique that a user may use to uniquely identify themselves, or a combination of one or more of the above listed items. The first and second users may supply the credentials to conference managers 200a and 200b, respectively, so that when the respective conference managers 200 register with Host Company's conference manager 200c they are able to supply their company's respective credentials. The credentials may be stored by memory 220. More specifically, conference manager 200a may store First Company's credentials, conference manager 200b may store Second Company's credentials, and Host Company's conference manager 200c may store the credentials associated with both First Company and Second Company.

Along with the exchange of credentials, the registration process may also involve conference managers 200a and 200b transmitting licenses and conference room information. The conference rooms may be identified as being conference rooms that are able to participate in back-to-back conferences, for convenience these conference rooms may be referred to as B2B conference rooms. In particular embodiments, conference manager 200a for example, may be configured to provide conference manager 200c with conference room information using an alias for the conference rooms. The alias may allow conference manager 200a to provide fictitious conference room(s) having capabilities similar to the capabilities of actual conference rooms. The fictitious conference room(s) may represent more than one actual conference room.

In particular embodiments, First Company and Second Company may need to authorize or enable conferencing with each other before they can participate in such a conference. For example, if First Company wants to engage in a conference with Second Company, conference manager 200a may first need to request that conference manager 200c enables conferencing with Second Company. This request may be passed on to an administrator from Second Company for approval. The administrator may then either accept or reject the request. Upon transmitting the approval to conference manager 200c, First Company may be able to engage in conferencing with Second Company through Host Company.

Once conferencing has been enabled between First Company and Second Company, conference managers 200a and 200b may request the rooms available from the other respective company. More specifically, using interface 230 conference manager 200a may transmit a request to conference manager 200c for information regarding the rooms made available by Second Company. This information may be stored in the memory of conference manager 200c (because room information was provided during registration) and thus may be readily available to be sent to conference manager 200a. This process may be treated as the discovery of B2B conference rooms of the other company.

The conference room information conference manager 200a receives from conference manager 200c may be passed to a messaging server (e.g., exchange 120) and made available to First Company's users through their calendaring program. More specifically, the first user, using his calendaring program, may be able to identify conference participants and/or conference rooms from both First Company and Second Company. The calendaring program may recognize that some of the participants are from Second Company (e.g., from their email addresses) and so may attempt to schedule one of Second Company's rooms. In some embodiments, Second Company may allow First Company's messaging server to directly determine the availability of Second Company's conference rooms. Accordingly, users from First Company may be able to use their calendaring program to see the availability of Second Company's conference rooms. In particular embodiments, conference manager 200a may have to request the information when the conference is initially scheduled.

If the desired conference rooms are available for the scheduled conference, then conference manager 200a may receive, via interface 230a, an indication of which rooms are to be used for the scheduled conference. Upon consulting data stored in memory 220, processor 210 may be able to determine that the conference involves Second Company because of the presence of one of Second Company's conference rooms. When processor 210 determines that one of the conference rooms to be used for the conference is not operated by First Company, processor 210 may generate a request to use the conference room from Second Company. Because conference manager 200c is hosting the conference, interface 230 may transmit the request to conference manager 200c.

Upon receiving the request, conference manager 200c may reserve the resources (e.g., any necessary port of a multipoint conferencing switch) for the conference and forward the request to conference manager 200b for approval or rejection. If the room is available and the conference is accepted conference manager 200b may update the free/busy status of the requested conference room and send an acceptance message to conference manager 200c.

Once conference manager 200c receives the acceptance from conference manager 200b it may determine the parameters to be used for the conference. These parameters may include a conference ID and a bridge phone number hosted by Host Company. These parameters may then be sent to conference managers 200a and 200b. Using these parameters, and whatever other conference details conference manager 200a may have stored in memory 220, conference manager 200a may push such information as may be needed to initiate the conference to the respective conference rooms. More specifically, conference manager 200a more transmit conference information to various components within the scheduled conference room so that when the first user is ready to initiate the conference he simply presses a single button to start or join the conference. In some embodiments this may be a soft-button on an IP phone. Pressing the soft-button may activate a video display device (e.g., a monitor), a sound reproduction device (e.g., a speaker), a video capture device (e.g., a video camera) and an audio capture device (e.g., a microphone). The devices needed for the conference may then be configured to capture/reproduce the appropriate signals so that the first user can see and hear the second user without having to perform any additional configuration of any of the components used for the conference. In some embodiments the conference may be initiated by dialing a fully qualified number.

Had the conference been rejected, conference manager 200c may have released the resources it had reserved for the conference and forwarded the rejection message to conference manager 200a.

Modifications, additions, or omissions may be made in how conference managers 200 synchronizes a conference and push the details to the conference room. For example, conference managers 200 may have exchanged tCards in synchronizing the details of the conference or in providing their capabilities.

Figure 3:
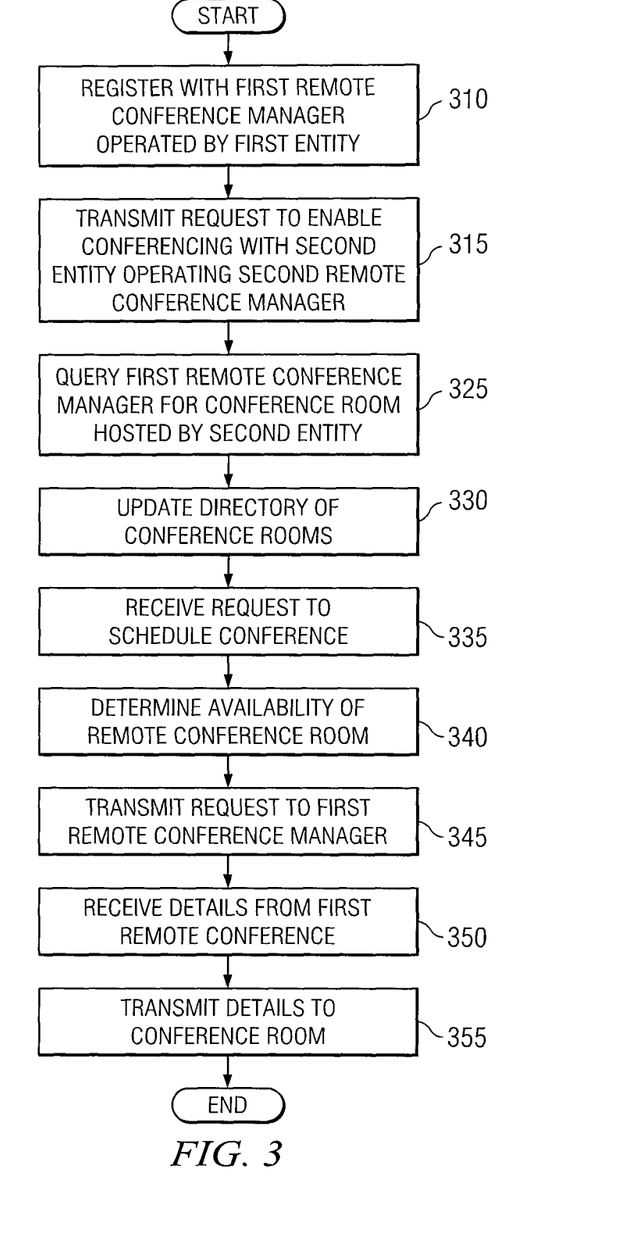
FIG. 3 is a flowchart illustrating a method for establishing a remotely hosted conference initiated with one button push, in accordance with particular embodiments.

FIG. 3 is a flowchart illustrating a method for establishing a remotely hosted conference initiated with one button push, in accordance with particular embodiments. For purposes of this method it may be assumed that a first entity hosts B2B conferences for other companies. As part of this service the first entity may provide a credential that may be used to identify those companies which have signed-up to have the first entity provide them with remote conference hosting. It may further be assumed that a local entity and a second entity, the two entities who wish to conduct a conference with each other through the first entity, have already established a business relationship with the first entity and have already received their credentials. For simplicity, the depicted method is from the perspective of a local conference manager operated by the local entity. The conference manager operated by the local entity shall be referred to as the local conference manager, the conference manager operated by the second entity shall be referred to as the second remote conference manager, and the conference manager operated by the first entity shall be referred to as the first remote conference manager.

The method begins at step 310 where the local conference manager registers with the first remote conference manager operated by the first entity. The registration may involve the use of a common or well known protocol and port (e.g., Hypertext Transfer Protocol and port 80). The registration process may include transmitting the local entity's credentials for the first remote conference manager to verify. The local conference manager may also transmit additional information, such as local conference room information, to the first remote conference manager. This information may include information regarding the capabilities, capacities, and/or features of the local conference room. In some embodiments the local entity may operate multiple conference rooms which it may want to be available for conferences hosted by the first entity. Accordingly, information regarding each of these conference rooms may be communicated to the first conference manager during registration. In some embodiments, all the information for the multiple conference rooms may be transmitted at the same time (e.g., at step 320 the local conference manager may transmit information indicative of multiple local conference rooms). In particular embodiments the local conference manager may transmit a conference room alias. The conference room alias may include information about the features, capabilities and/or capacities of one or more conference rooms operated by the local entity, but not corresponding to any actual conference room operated by the local entity. Though not depicted in the method, the second remote conference manager may have provided the first remote conference manager with similar information for one or more conference rooms operated by the second entity.

At step 315, the local conference manager transmits a request to enable conferencing with the second entity operating the second remote conference manager. This request may be transmitted to the first remote conference manager. The first remote conference manager may then pass the request to the second remote conference manager so that an administrator for the second entity may either approve or reject the request for conferencing with the local entity. For purposes of this method it may be assumed that the request was approved and the appropriate response was sent by the second remote conference manager.

At step 325 the local conference manager queries the first remote conference manager for conference rooms hosted by the second entity. In particular embodiments this may include information similar in type to the information provided by the local conference manager at step 320. The information received from the first remote conference manager may be used in scheduling conferences with users from the second entity. This is accomplished, in part, by adding the information regarding the second entity's conference rooms to a local directory of conference rooms. This is shown at step 330. Once the second entity's conference rooms have been added to the directory, users from the local entity may be able to schedule the second entity's conference room as easily as they would their own conference rooms. In some embodiments the second entity's conference room may be discoverable similar to local entity's own B2B conference rooms. In particular embodiments, the availability of the second entity's conference may be made available to the users working for the first entity through, for example, their calendaring program.

At step 335 the local conference manager receives a request to schedule a conference. The request may come from a user who is using a calendaring program. For example, the user may use his calendaring program to schedule a conference with several different users. Some of the users may work for the local entity and some may work for the second entity. The conference manager may be able to recognize that some of the participants work for the second entity and that the availability of the second entity's conference room may need to be determined.

At step 340 the availability of the second entity's remote conference rooms are determined. In some embodiments this may involve transmitting a request for the availability of the remote conference room which may either be accepted or rejected. In some embodiments the local conference manager may have access to the availability of the second entity's conference rooms and thus may not have to send a request and await approval to be able to determine the availability of the remote conference room.

At step 345, the local conference manager transmits the request to schedule a conference to the first remote conference manager. The request may be sent to the first remote conference manager because it is to act as a host for the conference between the local entity and the second entity. When the first remote conference manager receives the request for a conference it may reserve the resources, or a portion thereof, needed to host the conference. For example, the first conference manager may reserve one or more ports of a multipoint conferencing switch. It may keep the resources reserved until either the second entity rejects the conference request or the conference concludes.

Besides reserving the conferencing resources needed for the requested conference, the first remote conference manager may also retransmit the request, or transmit a similar request, to the second remote conference manager to be accepted or rejected. For purposes of this flowchart it may be assumed that upon receiving the request for a conference with users from the local entity, an appropriate user from the second entity accepted the conference. The acceptance may be transmitted to the first remote conference manager for retransmission to the local conference manager.

At step 350 the local conference manager receives conference details from the first remote conference manager. These details may include a call-in number, a meeting ID, a user ID, a password, and/or any other information that may be desired or needed to participate in the conference. These details, along with additional information may then, at step 355, be transmitted to the local conference room. In some embodiments, these details may be transmitted to a single device, such as a conference initiator, within the appropriate conference room (e.g., the conference room in which users from the local entity will be using to participate in the requested conference) that may then distribute any necessary information to the appropriate component within the conference room. In some embodiments, any necessary information may be transmitted directly to the appropriate devices within the conference room. By transmitting the conference details to the local conference room to be used for the conference it may be possible for a local user to enter the local conference room, simply press a single button and have the conference initiated with the users from the second entity. More specifically, the conference details may provide the various devices and components within the local conference with the information they need to be able to be configured to participate in the scheduled conference with the users from the second entity. This allows the users to focus on the conference itself, not initiating the conference.

Modifications, additions, or omissions may be made to the method depicted in FIG. 3. The flowchart may include more, fewer, or other steps. For example, the conference manager may have previously engaged in a conference with the second entity that was hosted by the first entity. Accordingly, the local conference manager may not need to transmit a request to enable conferencing with the second entity. Additionally, steps may be performed in any suitable order and by any suitable component.

Figure 4A:
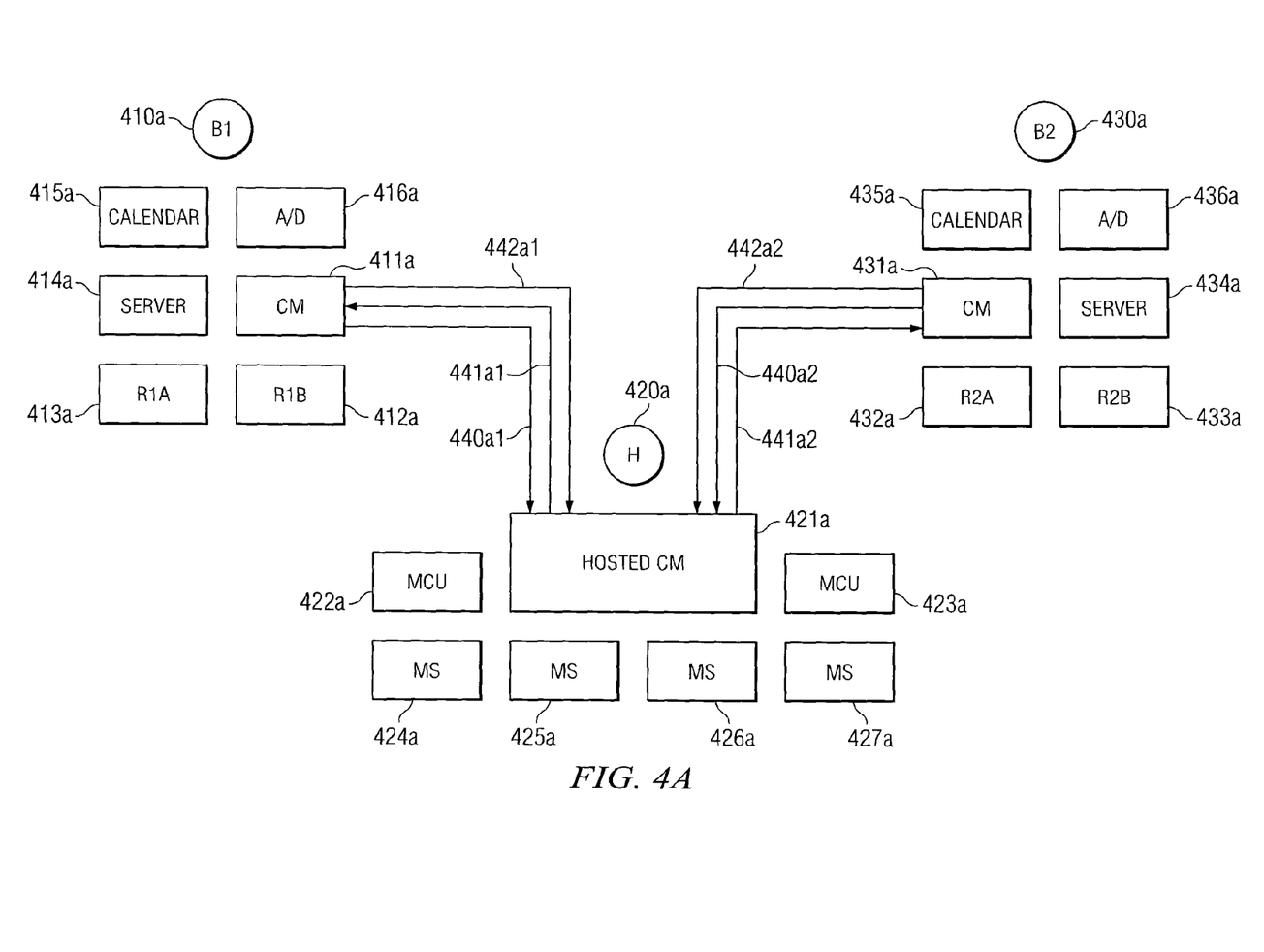
FIG. 4A is a block diagram illustrating signaling used to register with a host company, in accordance with particular embodiments.
Figure 4B:
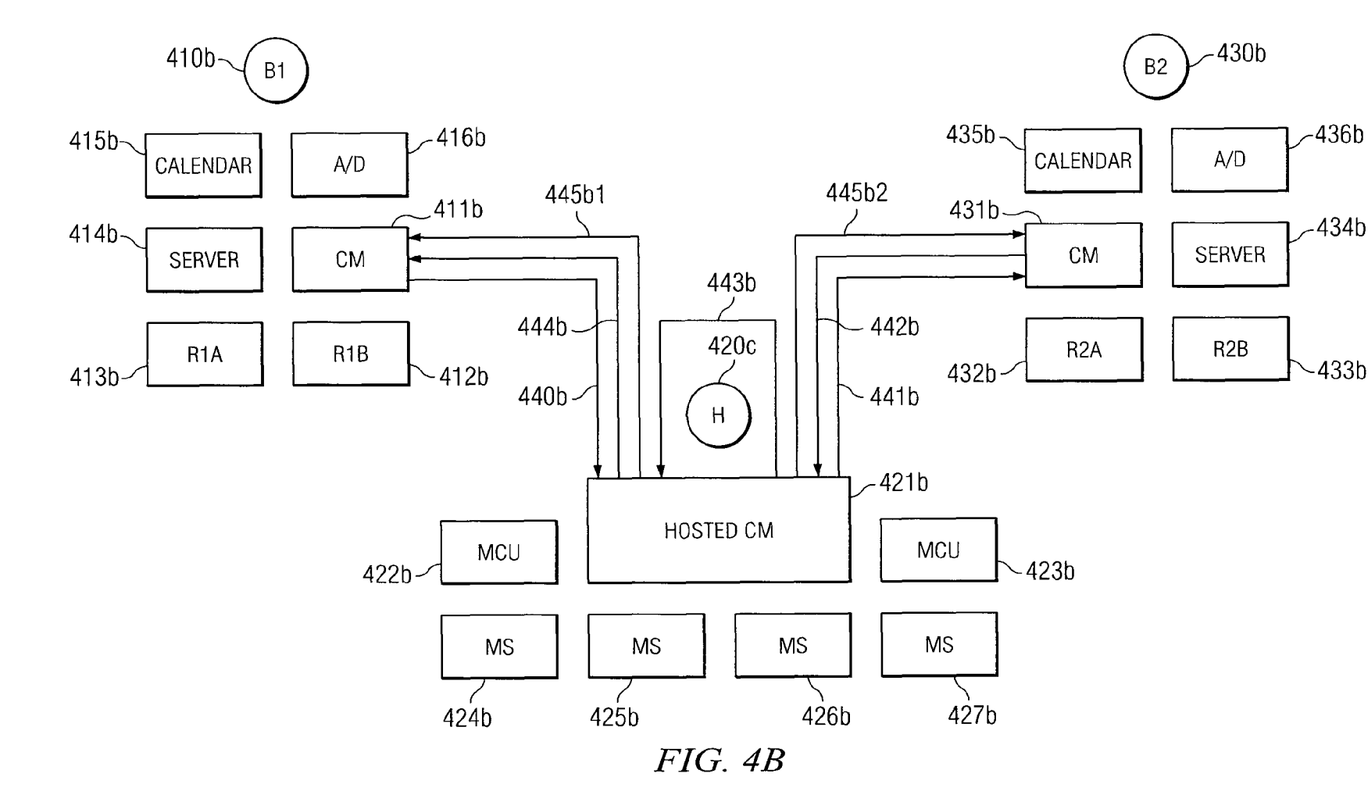
FIG. 4B is a block diagram illustrating signaling used to request back-to-back service with a remote company, in accordance with particular embodiments.
Figure 4C:
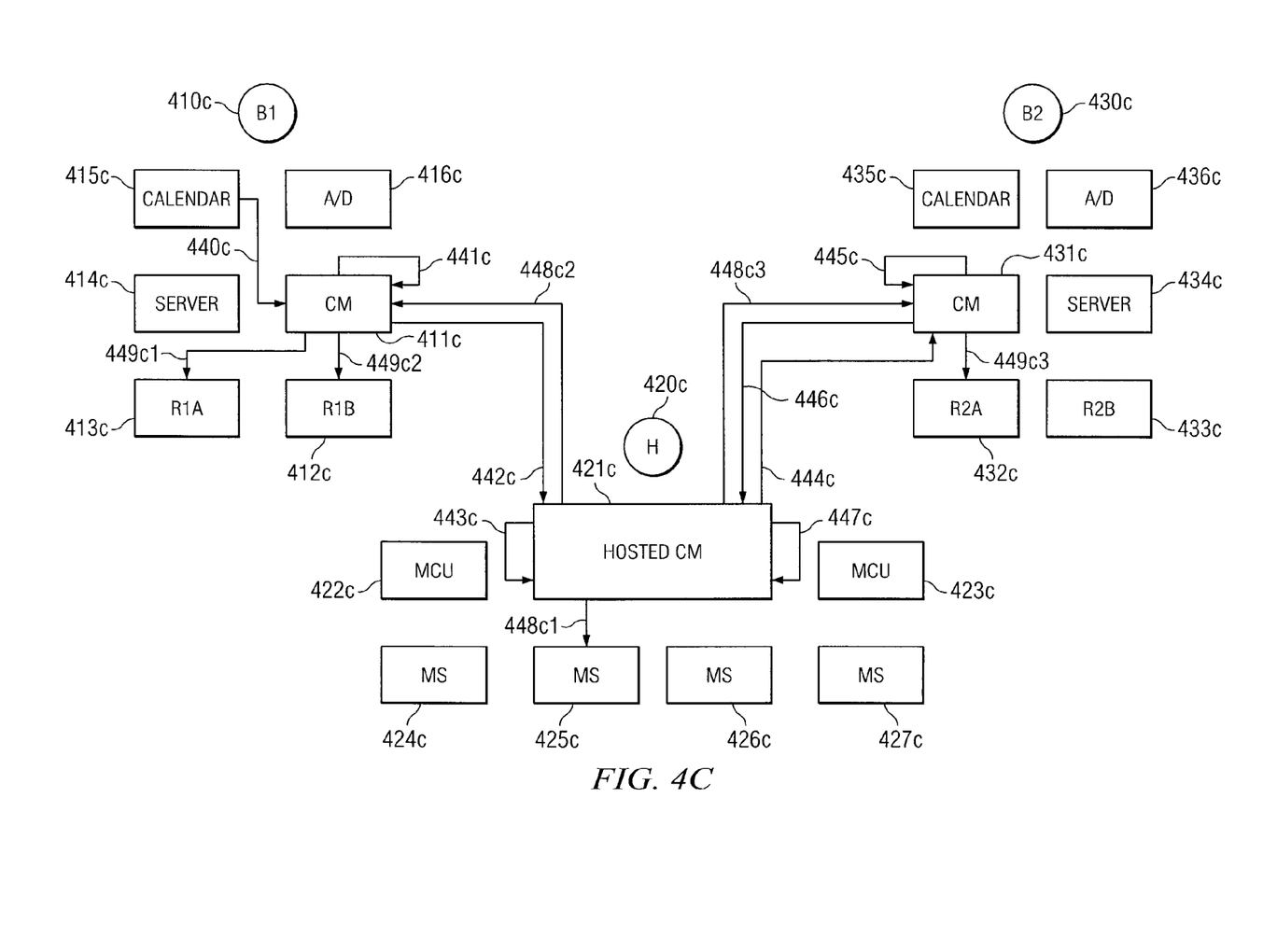
FIG. 4C is a block diagram illustrating signaling used to create a meeting, in accordance with particular embodiments.

FIGS. 4A-4C are block diagrams illustrating signaling in different situations between company sites and a host site, in accordance with particular embodiments. For simplicity, each of FIGS. 4A-4C include the same companies operating the same equipment. More specifically, Company B1 operates site 410 which includes conference manager 411, rooms 412 and 413, server 414, calendaring program 415, and active directory 416; Company B2 operates site 430 which includes conference manager 431, rooms 432 and 433, server 434, calendaring program 435, and active directory 436; and Host Company operates site 420 which includes host conference manager 421, multi-point conference units (MCUs) 422 and 423, and multipoint switches (MSs) 424-427.

FIG. 4A is a block diagram illustrating signaling used to register with a host company, in accordance with particular embodiments. The first messages sent are register messages 440a1 and 440a2. These messages may be sent at different times from conference manager 411a and 431a, respectively. For example, Company B1 may decide to register in February and Company B2 may decide to register in October. Register message 440a1 may comprise Company B1's credentials and register message 440a2 may comprise Company B2's credentials. It may be assumed that when Company B1 and Company B2 established their relationship with Host Company they each received their own credentials.

Assuming that register message 440a1 contained the proper information (e.g., credentials) and formatting, host conference manager 421a may send OK message 441a1 to Company B1's conference manager 411a. Similarly, assuming that register message 440a2 contained the proper information (e.g., credentials) and formatting, host conference manager 421a may send OK message 441a2 to Company B2's conference manager 431a. OK messages 441a1 and 441a2 may be sent shortly after host conference manager 421a receives the respective register messages 440a1 and 440a2. More specifically, once host conference manager 421a has received a register message and determined its validity, host conference manager 421a may generate an OK message. OK messages 441a1 and 441a2 may indicate that host conference manager 421a has verified the respective register messages 440a1 and 440a2.

Once conference manager 411a has received OK message 441a1 from host conference manager 421a, it may send room message 442a1 to host conference manager 421a. Similarly, once conference manager 431a has received OK message 441a2 from host conference manager 421a, it may send room message 442a2 to host conference manager 421a. As discussed above, room message 442a may comprise information about one or more real or fictitious conference rooms hosted by the sender of room message 442a. For example, Company B2 may have designated rooms 432a and 433a as being available for back-to-back conferences. Accordingly, when conference manager 431a sends room message 442a2, the message may comprise information about rooms 432a and 433a. As another example, Company B2 may create a fictitious room having properties that correspond to, or are similar to, the properties of rooms 432a and/or 433a. Accordingly, when conference manager 431a sends room message 442a2, the message may comprise the information related to the fictitious room.

FIG. 4B is a block diagram illustrating signaling used to request back-to-back service with a remote company, in accordance with particular embodiments. More specifically, FIG. 4B depicts Company B1 requesting B2B conferencing services with Company B2. To request the B2B service, conference manager 411b generates request message 440b which is sent to host conference manager 421b. Request message 440b may include a request to establish B2B services with Company B2.

Host conference manager 421b may then forward the request to Company B2's conference manager, conference manager 431b. The forwarded message is shown as forward message 441b. An administrator for Company B2 may be notified of the request so that the administrator may accept or reject the request for B2B service between Company B1 and Company B2. For purposes of this example it may be assumed that the administrator accepted the request for B2B service. The administrators answer is then conveyed to host conference manager 421b via acceptance message 442b.

Once host conference manager 421b receives acceptance message 442b it may update its databases to reflect that Company B1 and Company B2 may conduct B2B conferences with one another. This is shown as message 443b. Host conference manager 421b may also forward the acceptance message to conference manager 411b as acceptance message 444b. This may provide Company B1 with notice that Company B2 has agreed to participate in hosted B2B conferences with Company B1.

Additionally, host conference manager 421b provides Company B1 and Company B2 with the other company's room information. More specifically, host conference manager 421b sends room message 445b1 to Company B1's conference manager, conference manager 411b. Room message 445b1 comprises the room information of the B2B rooms made available by Company B2. Similarly, host conference manager 421b also sends room message 445b2 to Company B2's conference manager, conference manager 431b. Room message 445b2 comprises the room information of the B2B rooms made available by Company B1. Host conference manager 421b may already have this information available from when Company B1 and Company B2 registered (e.g., room messages 442a1 and 442a2). Once each company receives the other company's room information, their respective active directories (active directories 416a and 436a) may be updated. This may then allow the respective calendaring programs (calendaring programs 415b and 435b) to access the information as though it were another B2B conference room.

FIG. 4C is a block diagram illustrating signaling used to create a meeting, in accordance with particular embodiments. More specifically, in the example depicted in FIG. 4C, an employee of Company B1 has requested a conference using rooms 412*c* and 413*c* of Company B1 and room 432*c* of Company B2. The request may be entered by an employee of Company B1 via calendaring program 415*c*. Information about room 432*c* of Company B2 may be available to the employee of Company B1 via information stored within active directory 416*c*. This information may be derived from room message 445*b*1 (depicted in FIG. 4B).

The request is first delivered to Company B1's conference manager, conference manager 411*c*, via meeting request message 440*c*. Conference manager 411*c* may then determine that there is at least one remote participant and/or conference room involved in the requested conference. The requested conference may then be identified as a B2B conference that includes room 432*c*. This is shown in FIG. 4C as B2B message 441*c*. Conference manager 411*c* may then send meeting request message 442*c* to host conference manager 421*c*. Meeting request message 442*c* may contain information that host conference manager may be able to use to determine the resources (e.g., channels, bandwidth, audio, video, and/or data, etc.) that may be needed for the requested conference.

Using the information contained in meeting request message 442*c*, host conference manager 421*c* may determine the resources needed for the requested conference. This may include determining which MCU(s) and/or MS(s) to use for the requested conference. Whatever resources host conference manager 421*c* determines are needed for the conference may then be reserved. This is shown as message 443*c*. Host conference manager 421*c* may also send meeting request message 444*c* to Company B2's conference manager, conference manager 431*c* for acceptance, rejection or rescheduling.

Once conference manager 431*c* receives meeting request message 444*c* it may be able to determine if the room requested for the conference is available (e.g., is the requested room free or busy). This is shown as availability check message 445*c*. For purposes of this example it may be assumed that room 432*c* is available. Accordingly, conference manager 431 may send acceptance message 446*c* to host conference manager 421*c*.

Once host conference manager 421*c* receives acceptance message 446*c* it may be able to confirm the scheduled conference. Accordingly, host conference manager 421*c* may generate an access number and a conference ID associated with the requested conference via request message 442*c*. This is shown as confirmation message 447*c*. Once the conference details have been determined and generated host conference manager 421*c* may then push any necessary details to several different interested components. More specifically, conference detail message 448*c*1 may be sent to the MCU(s) and/or MS(s) that are to be used for the conference (e.g., MS 425*c*); detail message 448*c*2 may be sent to Company B1's conference manager, conference manager 411*c*; and detail message 448*c*3 may be sent to Company B2's conference manager, conference manager 431*c*.

Once conference managers 411*c* and 431*c* receive their respective conference detail messages they may be able to determine what information needs to be sent to the conference rooms to initiate the conference. This information may allow the conference participants to initiate the conference by simply pressing an appropriate button within their respective conference rooms. More specifically, upon a user pressing the appropriate button, all the local components needed for the user to be able to participate in the scheduled conference will be configured to allow the user to participate in the conference. This is done without any further action or input from the user. The information is contained in conference setup messages 449*c*1, 449*c*2 and 449*c*3.

Although particular embodiments have been described, a myriad of changes, variations, alterations, transformations, modifications, and alternate embodiments may be suggested to one skilled in the art, and it is intended that particular embodiments encompass such changes, variations, alterations, transformations, and modifications as falling within the scope of the appended claims. For example, in some embodiments the entity hosting conferences for other entities may be able to host conferences other than B2B conferences.

Certain embodiments may include all, some, or none of the above technical advantages. One or more other technical advantages may be readily apparent to one skilled in the art from the figures, descriptions, and claims included herein.

What is claimed is:

1. A method implemented via instructions encoded in a non-transitory computer-readable medium and executable by a processor, the method comprising:
   registering a first conference manager with a host conference manager, the host conference manager operated by a host entity, the first conference manager operated by a first entity that is physically separate from the host entity;
   transmitting to the host conference manager by the first conference manager a request to enable conferencing with a second entity that is physically separate from the first entity and the host entity, the second entity operating a second conference manager registered with the host conference manager;
   querying, by the first conference manager, the host conference manager for information indicative of at least one physical conference room operated by the second entity;
   updating, by the first conference manager, a directory of physical conference rooms comprising at least one physical conference room operated by the first entity to further comprise the at least one physical conference room operated by the second entity;
   receiving, by the first conference manager, a request to schedule a conference; and
   upon determining at least one physical conference room operated by the second entity is to be used for the scheduled conference:
      transmitting, by the first conference manager, the request to the host conference manager; and
   upon the second conference manager transmitting an acceptance of the scheduled conference:
      receiving, by the first conference manager, details from the host conference manager for establishing a connection for use with the scheduled conference;
      transmitting, by the first conference manager, the details for establishing the connection for use with the scheduled conference to the at least one physical conference room operated by the first entity; and
      by the first conference manager after the scheduled conference is initiated within the at least one physical conference room operated by the first entity, routing and switching of audio, video, or data needed for the scheduled conference between equipment in the at least one physical conference room operated by the first entity and the host conference manager such that audio, video, or data needed for the scheduled conference remains synchronized.

2. The method of claim 1, further comprising determining the availability of the at least one physical conference room operated by the second entity.

3. The method of claim 1:
   further comprising receiving a credential supplied by the host entity; and wherein registering with a host conference manager operated by a host entity comprises registering with a host conference manager operated by a host entity using the credential supplied by the host entity.

4. The method of claim 1, further comprising receiving from the host conference manager a room alias representing at least one physical conference room operated by an entity other than the first entity.

5. The method of claim 1, further comprising transmitting to the host conference manager information indicative of the at least one physical conference room operated by the first entity.

6. The method of claim 1, wherein registering with a host conference manager operated by a host entity comprises registering a third entity with the host conference manager, the third entity operating a third conference manager, the host conference manager configured to facilitate in establishing a conference between the second entity and the third entity in which the first entity is not a direct participant in the conference.

7. A method implemented via instructions encoded in a non-transitory computer-readable medium and executable by a processor, the method comprising:
registering a first conference manager with a host conference manager, the first conference manager operated by a first entity, the host conference manager operated by a host entity that is physically separate from the first entity;
registering a second conference manager with the host conference manager, the second conference manager operated by a second entity that is physically separate from the first entity and the host entity;
receiving by the host conference manager a request from the first entity for information indicative of at least one physical conference room operated by the second entity;
receiving by the host conference manager a request from the first entity for a conference with the second entity;
reserving by the host conference manager at least one resource for use in facilitating the conference;
upon receiving from the second conference manager a message rejecting the request for the conference:
releasing by the host conference manager the reservation of the at least one resource for use in facilitating the conference; and
transmitting, by the host conference manager to the first conference manager, a message indicating the second conference manager rejected the request for the conference;
upon receiving from the second conference manager a message accepting the request for the conference, transmitting by the host conference manager to the first conference manager and the second conference manager details for establishing a connection for use with the conference; and
after the conference is initiated, routing and switching of audio, video, or data needed for the conference between equipment operated by the first entity and the host conference manager such that audio, video, or data needed for the conference remains synchronized.

8. The method of claim 7, further comprising transmitting to the second conference manager a request from the first conference manager requesting to enable conferencing between the first entity and the second entity.

9. The method of claim 7, further comprising:
receiving information indicative of at least one conference room operated by the first entity and the at least one conference room operated by the second entity;
transmitting to the first conference manager the information indicative of the at least one conference room operated by the second entity;
transmitting to the second conference manager the information indicative of the at least one conference room operated by the first entity; and
transmitting to the second conference manager a request received from the first conference manager requesting a conference.

10. The method of claim 7, further comprising receiving from the first conference manager a room alias representing at least one physical conference room operated by an entity other than the first entity.

11. The method of claim 7, further comprising providing the first entity with access to the room availability of the at least one physical conference room operated by the second entity.

12. The method of claim 7, further comprising:
receiving a request for access to the availability of the at least one physical conference room operated by the second entity;
transmitting the request to the second conference manager;
upon receiving the availability of the at least one physical conference room operated by the second entity, transmitting the availability of the at least one physical conference room operated by the second entity.

13. A system comprising:
an interface of a first conference manager, the first conference manager operated by a first entity, the interface operable to:
transmit a registration request to a host conference manager operated by a host entity that is physically separate from the first entity;
transmit to the host conference manager a request to enable conferencing with a second entity that is physically separate from the first entity and the host entity, the second entity operating a second conference manager registered with the host conference manager; and
query the host conference manager for information indicative of at least one physical conference room operated by the second entity; and
a microprocessor coupled to the interface and operable to update a directory of physical conference rooms comprising at least one physical conference room operated by the first entity to further comprise the at least one physical conference room operated by the second entity;
wherein the interface is further operable to:
receive a request to schedule a conference;
upon the microprocessor determining at least one physical conference room operated by the second entity is to be used for the scheduled conference:
transmit the request to the host conference manager; and
upon the second conference manager transmitting an acceptance of the scheduled conference:
receive details from the host conference manager for establishing a connection for use with the scheduled conference;
transmit the details for establishing the connection for use with the scheduled conference to the at least one physical conference room operated by the first entity; and
after the scheduled conference is initiated within the at least one physical conference room operated by the first entity, route and switch of audio, video, or data needed for the scheduled conference between equipment in the at least one physical conference room operated by the first entity and the host conference manager such that audio, video, or data needed for the scheduled conference remains synchronized.

14. The system of claim 13, wherein the microprocessor is further operable to determine the availability of the at least one physical conference room operated by the second entity.

15. The system of claim 13:
wherein the interface is further operable to receive a credential supplied by the first entity; and
wherein the interface operable to transmit a registration request to a host conference manager operated by a host entity comprises an interface operable to transmit a registration request to a host conference manager operated by a host entity using the credential supplied by the host entity.

16. The system of claim 13, wherein the interface is further operable to receive from the host conference manager a room alias representing at least one physical conference room operated by an entity other than the first entity.

17. The system of claim 13, wherein the interface is further operable to transmit to the host conference manager information indicative of the at least one physical conference room operated by the first entity.

18. A system comprising:
an interface of a host conference manager, the host conference manager operated by a host entity, the interface operable to:
receive a registration request from a first conference manager operated by a first entity that is physically separate from the host entity;
receive a registration request from a second conference manager operated by a second entity that is physically separate from the first entity and the host entity;
receive a request from the first entity for information indicative of at least one physical conference room operated by the second entity;
receive a request from the first entity for a conference with the second entity; and
a microprocessor coupled to the interface and operable to:
reserve at least one resource for use in facilitating the conference;
upon receiving from the second conference manager a message rejecting the request for the conference:
release the reservation of the at least one resource for use in facilitating the conference;
transmit a message indicating the second conference manager rejected the request for the conference; and
upon receiving from the second conference manager a message accepting the request for the conference, transmit to the first conference manager and the second conference manager details for establishing a connection for use with the conference;
wherein after the conference is initiated, audio, video, or data needed for the conference between equipment operated by the first entity and the host conference manager is routed and switched such that audio, video, or data needed for the conference remains synchronized.

19. The system of claim 18, wherein the interface is further operable to transmit to the second conference manager a request from the first conference manager requesting to enable conferencing between the first entity and the second entity.

20. The system of claim 18, wherein the interface is further operable to:
receive information indicative of at least one physical conference room operated by the first entity and the at least one physical conference room operated by the second entity;
transmit to the first conference manager the information indicative of the at least one physical conference room operated by the second entity;
transmit to the second conference manager the information indicative of the at least one physical conference room operated by the first entity; and transmit to the second conference manager a request received from the first conference manager requesting a conference.

21. The system of claim 18, wherein the interface is further operable to provide the first entity with access to the room availability of the at least one physical conference room operated by the second entity.

22. The system of claim 18, wherein the interface is further operable to:
receive a request for access to the availability of the at least one physical conference room operated by the second entity;
transmit the request to the second conference manager;
upon receiving the availability of the at least one physical conference room operated by the second entity, transmit the availability of the at least one physical conference room operated by the second entity.

* * * * *